May 6, 1952    E. A. FUGLIE    2,595,838
APPARATUS FOR CLEANING PARTS AND FOR SEPARATING
SUSPENDED PARTICLES FROM LIQUIDS
Filed July 2, 1945    2 SHEETS—SHEET 1

INVENTOR
ELMER A. FUGLIE
BY
ATTORNEY

INVENTOR
ELMER A. FUGLIE
ATTORNEY

Patented May 6, 1952

2,595,838

UNITED STATES PATENT OFFICE 2,595,838

APPARATUS FOR CLEANING PARTS AND FOR SEPARATING SUSPENDED PARTICLES FROM LIQUIDS

Elmer A. Fuglie, Winona, Minn., assignor to Winona Tool Mfg. Company, Winona, Minn., a corporation of Minnesota Application July 2, 1945, Serial No. 602,807

8 Claims. (Cl. 134—111)

My invention relates to apparatus for separating suspended particles from liquids, and has for its object to provide an efficient, simple and easily operable arrangement of steps and of parts in an apparatus for bringing about certain separation of solid particles in suspension in fluids, such, for example, as cutting oil used in connection with the operation of tools which cut and shape metals and washing fluid used in cleaning mechanical parts such as automobile parts.

In garages and other places where parts, such as gears, pistons, rods and other parts of automobiles, have to be cleaned of possible long standing adherent material, it has been customary to subject them in various ways to the action of a cleaning liquid. This cleaning liquid has a base such as kerosene or other petroleum derivatives or synthetic chemical combinations sold under well-known trade names. Its use involves considerable expense and in the present practice much of it has to be discarded after a single use. It is a primary purpose of my invention to conserve this cleaning liquid and reuse it many times.

The solid particles held in suspension in the cleaning liquid may be and usually are very small and can not be readily separated from the liquid which contains them. Where settling has been depended upon to take place in containers having substantial depths, the settling ordinarily is so slow that it has been considered more economical practice to throw away the contaminated cleaning liquid and draw on fresh supplies thereof. Customary filtering means have proved very uneconomical because the fine particles soon clog the filter and render it inoperative.

I have discovered that if the cleaning liquid after use is constrained to go at a very slow rate in thin layers of large area and is withdrawn only from the extreme top of that area, the particles in suspension will gravitate the short distance necessary from the top toward the bottom of the thin layers of large area so the liquid drawn from these large areas of slow moving liquid will be substantially freed of the particles of any size larger than the finest dust.

I have further discovered that this process may be carried on continuously directly in connection with its use so that the same pump which feeds the material for cleaning the parts, will cause the liquid to go to and through the separating means employed in connection with my method and to go continuously back to the pump to be again and again jetted therefrom.

It is a principal object of my invention therefore to take cleaning liquid or any other liquid directly from the jet formed by a pump for washing parts, and to cause it to go in thin layers over very large areas and to leave said layers at the tops thereof, and to carry on the operation continuously as liquid is employed for the purpose intended.

It is a further object of my invention to cause the liquid to be moved by the pump in producing a jet and thereafter to be collected in a multiplicity of settling pans in each of which the liquid will be formed in a thin layer of large area, and to cause the liquid to be skimmed from the upper part only of said layer and to go from the pans after being so skimmed ultimately to a central area.

It is a further object of my invention to bring the liquid from the jet into an annular chamber of relatively large diameter in which the heavier particles of matter carried in suspension in the liquid may immediately settle to and be accumulated at the bottom of said chamber, and thereafter to cause the liquid to enter circular pans at the tops thereof throughout their circumferential extent to form thin layers of very slow-moving liquid in the pans.

It is a further object of my invention where the apparatus is used for cleaning parts to provide means for connecting the same with the pump which causes production of the jet of the cleaning fluid discharged upon the articles to be cleaned, so my cleaning apparatus becomes in effect the sump for receiving the recirculated cleaning fluid, and the fluid is always moved by the pump to the jet in a thoroughly cleaned condition after the separation of the solid particles therefrom has taken place.

The full objects and advantages of my invention will appear in connection with the detailed description thereof which will now be given in the following specification, and the novel features of the invention by which the aforesaid advantageous results are obtained will be particularly pointed out in the claims.

In the drawings illustrating applications of my invention in some of its forms:

Fig. 1 is a partial sectional elevational view of my invention taken on the lines 1—1 of Fig. 2, applied to a separating device for taking dirt, oil and the like from washing fluid where the fluid has been employed to clean fouled parts such as used parts of automobiles or the like.

Figure 1:
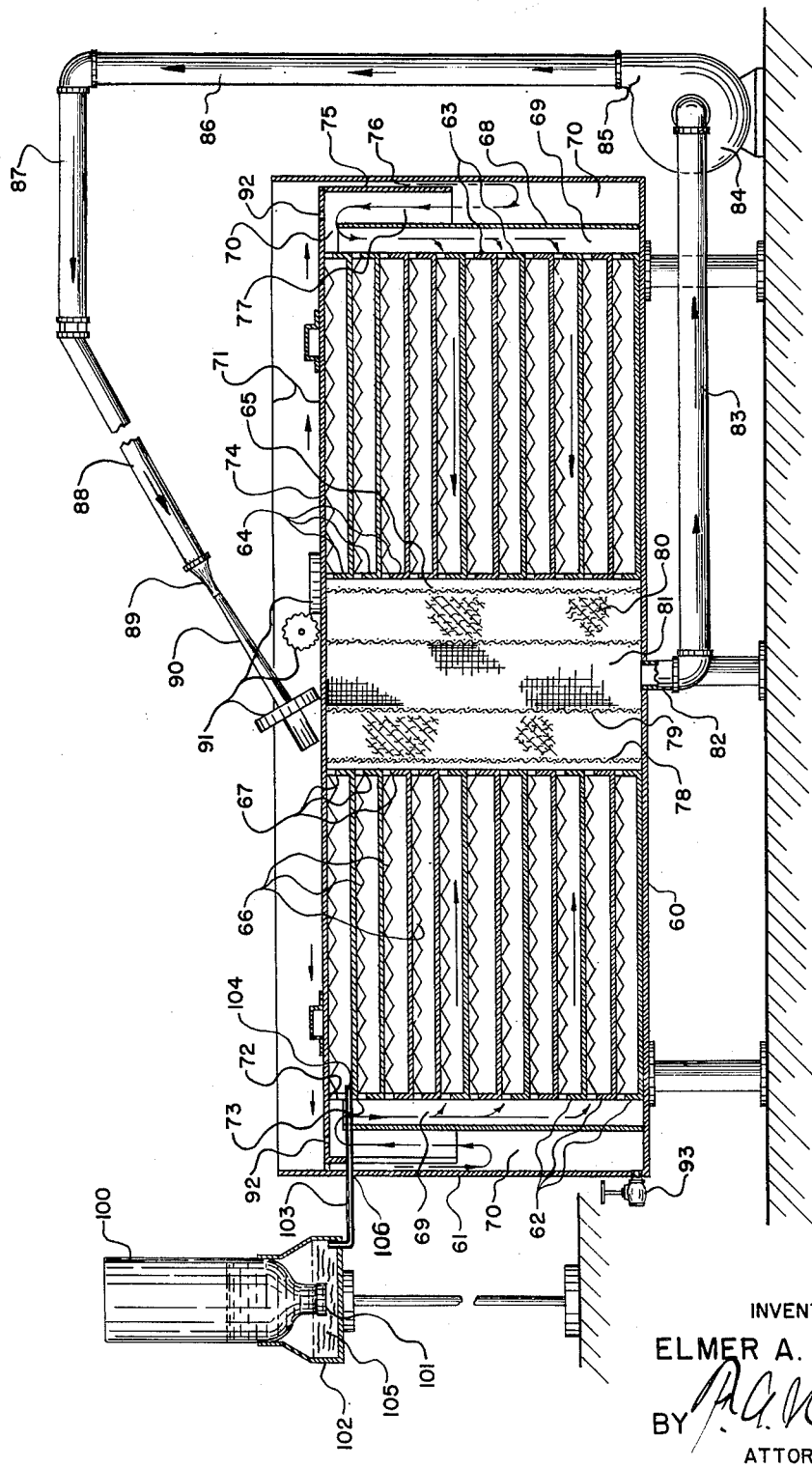
Figure 2:
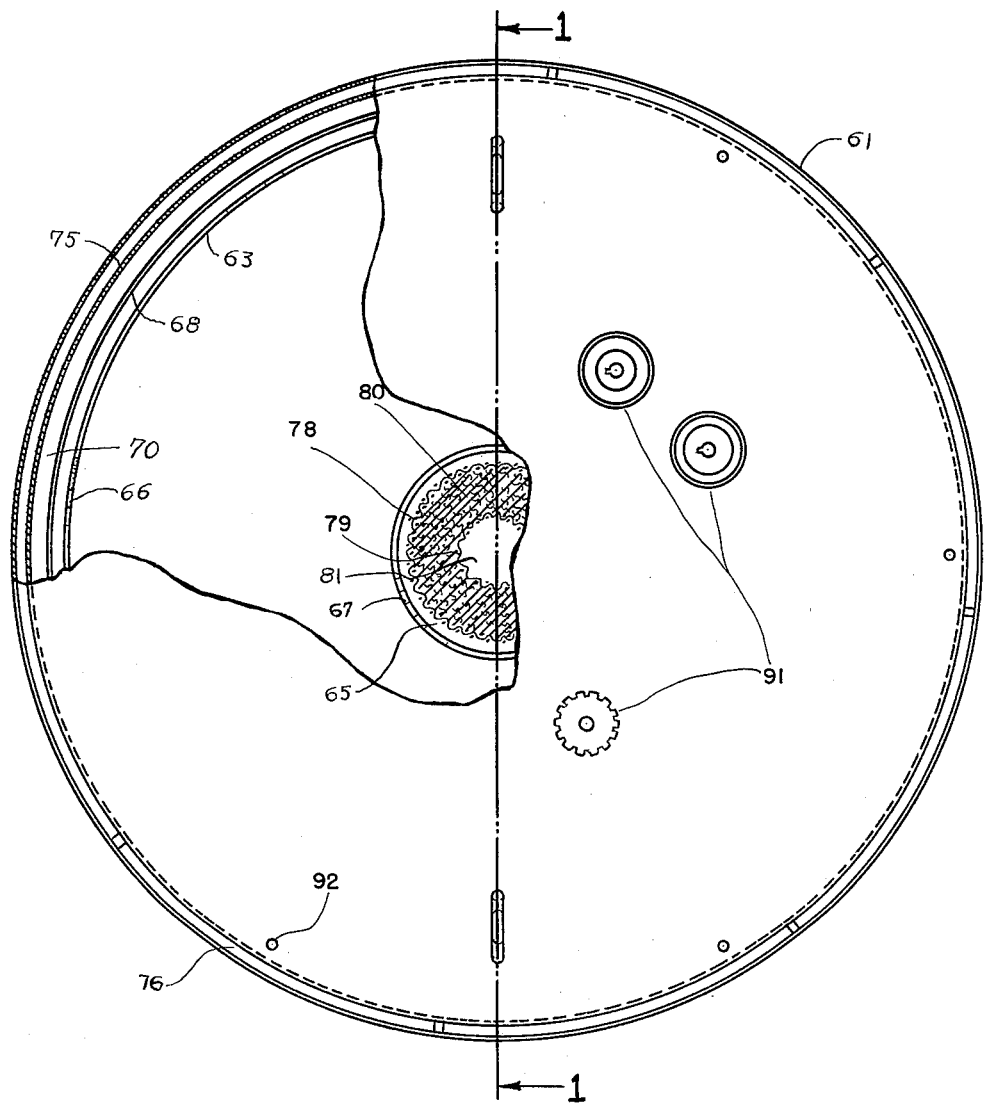
Fig. 2 is a top plan view of what is shown in Fig. 1 with some parts broken away and in section.

Figs. 1 and 2 illustrate the application of my invention to the cleaning of parts. In this form of the invention there is an outer casing comprising a horizontal bottom member 60 to which is attached a cylindrical member 61 enclosing a large chamber for the washing means. A series of pans 62 are formed with outer cylindrical walls 63 and inner cylindrical walls 64 which surround a central chamber 65, and these walls have serrated edges, as indicated at 66 and 67 in Fig. 1.

A cylindrical wall 68 is secured to bottom 60 and is spaced from the wall formed by pan walls 63 to form an annular chamber 69 between the said pan walls 63 and cylindrical wall 68. Likewise the cylindrical wall 68 is spaced from the outer wall 61 to form an annular chamber 70 between the wall 68 and the outer wall 61.

The top of the rack of pans 62 drops substantially below the upper edge of the outer wall 61 as indicated at 71 in Fig. 1, and within this space and resting upon the upper serrated edges 72 of the upper pan 73 is a removable flat cover member 74 which is of slightly less diameter than the inside diameter of the outer cylindrical wall 61.

From the edge of the cover member 74 depends an annular cylindrical wall 75 leaving a narrow annular passageway 76 extending downwardly into chamber 70 where the corresponding but somewhat wider annular passageway 77 leads upwardly from the lower edge of the portion 75 to the cover 74 and the serrated upper edge 72 of the top pan 73 as shown in Fig. 1.

Within the chamber 65 is located an annular filter member formed of outer and inner cylindrical walls 78 and 79, the wall 79 enclosing a vertical cylindrical chamber 81 centrally located within the wall 79.

The cylindrical walls 78 and 79 are formed of foraminous material such as wired gauze and the annular space between them is filled with filtering material indicated as 80.

From the bottom of chamber 81 leads a pipe 82 which is connected by a pipe 83 with a pump 84. The discharge end 85 of pump 84 connects through piping 86 and 87 with a flexible tube 88 terminating in a nozzle 89. This nozzle 89 produces a spray jet indicated at 90 which impinges upon automobile or other parts 91 resting upon the top plate 74 in position to be cleaned by the spray from nozzle 89. The flexible hose 88 will be long enough to reach any part of the table formed by top member 74 thus permitting the spraying of articles anywhere upon the table top 74. The washing liquid thus is circulated through my separating device by the spray-making pump and clean liquid always goes to the spray and the parts being cleaned.

Vents 92 extend through the top 74 into annular chamber 77 to admit used liquid into chamber 70 and to prevent the trapping of air in the upper part of said chamber and in the upper part of chamber 69. Cock 93 leads from the bottom of chamber 70 which may be washed out through 93.

The operation of my invention causes the liquid (some kind of washing liquid) to be moved by the pump to discharge in a jet upon the articles to be cleaned, which may be moved about on the table 74 to expose all parts thereof.

The liquid itself together with the material washed from the parts moves through vents 92 and the annular passageway 76 first, into the chamber 70, and then over the top of cylindrical partition 68, into the annular chamber 69. From chamber 69 the liquid moves into the tops of the pans 62 where the thin layers of large area bring about very slow movement of the liquid across the areas of these pans to discharge from the tops of the layers through serrations 67 to chamber 65 from which the liquid passes through annular vertical filter 80 into chamber 81 and back to the pump line.

In time an accumulation of sludge including solid particles will form at the bottoms of chambers 69 and 70 and also over the bottoms of the various pans employed. When such accumulations become sufficiently considerable it will be necessary to clean them. This can be done readily.

To clean the form of the device shown in Figs. 1 and 2 it is only necessary to lift off the top plate 74 and then successively lift and clean the several pans 62 and clean out the bottoms of chambers 69 and 70. This cleaning operation may be readily and quickly affected as can be seen.

In order to insure that the chamber 65 and 81 and the intervening annular filter are at all times filled with liquid, I provide as shown in Fig. 1 a container 100 which is held so the open end 101 thereof is immersed in liquid in a receptacle 102. This receptacle connects with tubing 103 which extends through the upper wall of the top annular pan 73 at the point indicated at 104. The level of the liquid when it reaches the open mouth of container or bottle 100 will be on a line indicated at 105, which is the level of the under side of cover member 74. If for any reason the level of liquid in chamber 65 drops below that line air will be admitted through tube 103. The tube 103 extends through a slot 106 which is formed on the depending wall 75 of top member 74 as clearly indicated in Fig. 1.

In this manner it will be assured that the central chamber 65 and all of the pans will be kept filled with the liquid at all times.

The advantages of my invention have been quite clearly demonstrated in connection with the description heretofore given. The paramount advantage arising from the use of my invention comes in the fact that by inserting my device for separating solid particles from the liquids used in the pumping line leading from the separator casing acting as a sump to the pump and then to the jet nozzle, I utilize the movement of liquids in the actual operations involved to produce cleaned liquid, to be directly applied as cleaned liquid to the metal parts being shaped or articles being cleaned.

I claim:

1. Apparatus for cleaning mechanical parts which cut and shape metals and for removing particles from the cleaning liquid while the cleaning takes place, comprising a casing having top and bottom walls and an outer wall united with the bottom wall and having a portion extending above the top wall to form an open-topped chamber adapted to receive loosely and indefinitely positioned upon said top wall the parts to be cleaned, means including said outer wall forming an outside annular chamber adapted to contain a cleaning liquid having liquid-flow connection at its top with said first named chamber, means forming a central chamber within the casing with an opening through its bottom, an annular filter surrounding the central chamber, said central chamber having connection through the filter with the annular chamber, means for causing liquid to be introduced into the central chamber and a pump connected to draw said liquid from the central chamber and force it in the form of a jet upon the articles to be cleaned within their supporting chamber and upon the top wall forming its bottom.

2. Apparatus for cleaning mechanical parts which cut and shape metals and for removing particles from the cleaning liquid while the cleaning takes place, comprising a casing having top and bottom walls and an outer wall united with the bottom wall and having a portion extending above the top wall to form an open-topped chamber adapted to receive loosely and indefinitely positioned upon said top wall the parts to be cleaned, means including said outer wall forming an outside annular chamber adapted to contain a cleaning liquid having liquid-flow connection at its top with said first named chamber, means forming a central chamber within the casing with an opening through its bottom, an annular filter surrounding the central chamber, said central chamber having connection through the filter with the annular chamber, parts of said connection comprising a partition in said annular chamber adapted to permit overflow of liquid over its top edge, and a pump connected to draw liquid from the central chamber and force it in the form of a jet upon the articles to be cleaned within the open-topped chamber and upon the top wall forming its bottom.

3. Apparatus for cleaning mechanical parts which cut and shape metals and for removing particles from the cleaning liquid while the cleaning takes place, comprising a casing having top and bottom walls and an outer wall united with the bottom wall and having a portion extending above the top wall to form an open-topped chamber adapted to receive loosely and indefinitely positioned upon said top wall the parts to be cleaned, means including said outer wall forming an outside annular chamber adapted to contain cleaning liquid having liquid-flow connection at its top with said first named chamber, means forming a central chamber within the casing with an opening through its bottom, an annular filter surrounding the central chamber, said central chamber having connection through the filter with the annular chamber, parts of said connection including a multiplicity of annular pans with raised annular edges at the outer and inner portions thereof forming chambers of relatively large area and small depth, said inner portions surrounding said annular filter, said pans being formed to permit entrance of liquid at the tops of their outer walls and exit of liquid to an annular filter at the tops of their inner walls, and a pump connected to draw liquid from the central chamber and force it in the form of a jet upon the articles to be cleaned within their supporting top chamber and from the top wall forming its bottom.

4. In apparatus for removing particles from mechanical parts by impact of cleaning liquid, means for removing the particles from the cleaning liquid while the cleaning takes place, comprising a casing having top and botom walls and an outer wall united with the bottom wall and having a portion extending above the top wall to form an open-topped chamber adapted to receive loosely and indefinitely positioned upon said top wall the parts to be cleaned, means including said outer wall forming an outside annular chamber adapted to contain cleaning liquid having liquid-flow connection at its top with said first named chamber, means forming a central chamber within the casing with an opening through its bottom, an annular filter surrounding the central chamber, said central chamber having connection through the filter with the annular chamber, parts of said connection including a multiplicity of annular settling pans with raised annular edges at the outer and inner portions thereof forming chambers of relatively large area and small depth, said pans resting one upon the other and freely movable upwardly, said top wall comprising a removable cover resting upon the upper edges of the walls of the top pan, whereby by removing the cover the several pans can be removed for cleaning.

5. Apparatus for cleaning mechanical parts and for removing particles from the cleaning liquid while the cleaning takes place, comprising means forming a first member adapted to contain cleaning liquid positioned within said casing through which the liquid slowly passes, wherein coarser particles carried by the liquid are precipitated by gravity, said member having a central aperture forming part of a chamber opening through the bottom of the casing, a second member formed as an annular filter member positioned about the central portion of said first member to filter fine particles from the liquid after the same has passed over the surface of said first member, a removable top of the casing adapted to support loosely and indefinitely positioned upon it said parts to be cleaned, and a pump positioned and operating to continuously draw liquid from the center of said annular filter member and to form a jet for impinging said liquid upon the articles to be cleaned so supported.

6. Apparatus for cleaning mechanical parts and for removing particles from the cleaning liquid while the cleaning takes place, comprising a cylindrical casing, a plurality of members carried within said casing in spaced relation to the inner wall thereof in such a manner as to form a first annular chamber adapted to contain cleaning liquid, each of said members having a central opening, all said openings being in alignment for forming a second circular chamber within the central portion of the casing, an annular filter member positioned in said second chamber there being an opening through the central part of the bottom wall of the casing, a removable top above said members spaced from the outer wall of the casing so as to communicate with said first chamber, said top forming a table to receive loosely and indefinitely positioned thereon parts to be cleaned, and a pump positioned and operating to continuously draw liquid through said opening from within said annular filter member and to form a jet for impinging said liquid upon the articles to be cleaned so supported.

7. A device for cleaning parts and for separating from the cleaning liquid solid particles of the matter gathered from the parts being cleaned which are held by the device—in order to avoid confusion and misinterpretation, comprising a cylindrical casing having a removable top adapted to support the parts during the cleaning operation, a system of annular setting pans in the casing spaced from the inner walls of the casing to form an annular chamber about the system having a cylindrical central chamber therein, an annular filtering member within the central chamber, said top being spaced at its outer edges from the casing walls to form openings at the edges of said top, a pump having connection with the bottom of the central chamber and having a nozzle carried above and directed upon said top, whereby cleaning liquid in the casing may be directed as a jet upon the articles to be cleaned and may be circulated continuously through the settling and filtering system and cleaned liquid only be delivered to the jet.

8. A device for cleaning parts and for separating from the cleaning liquid solid particles of the matter gathered from the parts being cleaned which are held by the device—in order to avoid confusion and misinterpretation, comprising a cylindrical casing having a removable top adapted to support the parts during the cleaning operation, a system of annular settling pans in the casing spaced from the inner walls of the casing to form an annular chamber about the system having a cylindrical central chamber therein, an annular filtering member within the central chamber, said top being spaced at its outer edges from the casing walls to form openings at the edges of said top, means for automatically supplying cleaning liquid to the system of pans and to the central chamber within the filtering member to maintain said chamber and the settling pans filled with cleaning liquid at all times, said means including a pump connected with the bottom of the central chamber and a jetting device connected with the pump and having a nozzle carried above and directed upon said top whereby cleaning liquid in the casing will be delivered as a jet upon the articles to be cleaned and be thereby circulated continuously through the settling and filtering system and cleaned liquid only be delivered to the jet.

ELMER A. FUGLIE.

REFERENCES CITED

The following references are of record in the file of this patent:

UNITED STATES PATENTS

| Number | Name | Date |
|---|---|---|
| 668,441 | Dyer | Feb. 19, 1901 |
| 1,041,533 | Wagner | Oct. 15, 1912 |
| 1,265,893 | Figg | May 14, 1918 |
| 1,701,864 | Reinhardt | Feb. 12, 1929 |
| 1,705,329 | Hills et al. | Mar. 12, 1929 |
| 1,754,667 | Cabrera | Apr. 15, 1930 |
| 1,761,812 | Breton | June 3, 1930 |
| 1,820,608 | Engel | Aug. 25, 1931 |
| 2,119,013 | Kerns et al. | May 31, 1938 |
| 2,178,701 | Petre | Nov. 7, 1939 |
| 2,207,399 | Gaertner | July 7, 1940 |
| 2,346,018 | Fulton | Apr. 4, 1944 |